US009615519B2

(12) United States Patent
Matsuno et al.

(10) Patent No.: US 9,615,519 B2
(45) Date of Patent: Apr. 11, 2017

(54) PLANT CULTIVATION MATERIAL AND PLANT CULTIVATION METHOD USING THE MATERIAL

(71) Applicants: MITSUI CHEMICALS, INC., Minato-ku (JP); PHYTOCULTURE CONTROL CO., LTD., Osaka (JP)

(72) Inventors: Hirozumi Matsuno, Minato-ku (JP); Yasushi Nawa, Singapore (SG); Kunisuke Tanaka, Osaka (JP); Daisuke Suzumura, Osaka (JP); Ryo Hasegawa, Osaka (JP)

(73) Assignees: MITSUI CHEMICALS, INC., Tokyo (JP); PHYTOCULTURE CONTROL CO., LTD., Osaka (JP)

( * ) Notice: Subject to any disclaimer, the term of this patent is extended or adjusted under 35 U.S.C. 154(b) by 0 days.

(21) Appl. No.: 14/391,245

(22) PCT Filed: Apr. 5, 2013

(86) PCT No.: PCT/JP2013/060503
§ 371 (c)(1),
(2) Date: Oct. 8, 2014

(87) PCT Pub. No.: WO2013/154053
PCT Pub. Date: Oct. 17, 2013

(65) Prior Publication Data
US 2015/0080492 A1 Mar. 19, 2015

(30) Foreign Application Priority Data

Apr. 9, 2012 (JP) ................................. 2012-088696

(51) Int. Cl.
*A01G 31/00* (2006.01)
(52) U.S. Cl.
CPC .......... *A01G 31/001* (2013.01); *Y02P 60/216* (2015.11)
(58) Field of Classification Search
CPC .................................................. A01G 31/001
USPC ........................................................ 523/123
See application file for complete search history.

(56) References Cited

U.S. PATENT DOCUMENTS 6,032,409 A 3/2000 Obonai et al.
2002/0134013 A1* 9/2002 Obonai et al. ................ 47/65.5

FOREIGN PATENT DOCUMENTS

| CN | 1199320 A | 11/1998 |
|---|---|---|
| EP | 1145621 A1 | 10/2001 |
| JP | 62-104528 A | 5/1987 |
| JP | 7-255270 A | 10/1995 |
| JP | 3044006 B2 | 5/2000 |
| JP | 2000-157078 A | 6/2000 |
| JP | 2000-224934 A | 8/2000 |
| JP | 2001-45895 A | 2/2001 |
| JP | 2004-350655 A | 12/2004 |
| JP | 2006-217874 A | 8/2006 |
| JP | 2009-153398 A | 7/2009 |
| WO | WO 97/08938 A1 | 3/1997 |
| WO | WO 98/53669 A1 | 12/1998 |
| WO | WO 2004/098270 A1 | 11/2004 |

OTHER PUBLICATIONS

International Search Report (PCT/ISA/210) mailed on Jul. 2, 2013, by the Japanese Patent Office as the International Searching Authority for International Application No. PCT/JP2013/060503.
Written Opinion (PCT/ISA/237) mailed on Jul. 2, 2013, by the Japanese Patent Office as the International Searching Authority for International Application No. PCT/JP2013/060503.
Office Action issued by the Japanese Patent Office in corresponding Japanese Patent Application No. 2014-510153 on Sep. 15, 2015 (4 pages including partial English translation).
Office Action issued by the Chinese Patent Office in corresponding Chinese Patent Application No. 201380019182.0 on Jul. 3, 2015 (10 pages).
Office Action issued by the Australian Patent Office in corresponding Australian Patent Application No. 2013247832 on Aug. 17, 2015 (6 pages).
Office Action issued by the Taiwanese Patent Office in corresponding Taiwanese Patent Application No. 102112562 on Mar. 24, 2016 (4 pages including partial English translation).
Supplemental European Search Report issued by the European Patent Office in corresponding Patent Application No. 13775694.6 on Nov. 13, 2015 (8 pages).

* cited by examiner

*Primary Examiner* — Edward Cain
(74) *Attorney, Agent, or Firm* — Buchanan, Ingersoll & Rooney PC

(57) ABSTRACT

Plant cultivation materials, which have the liquid retentivity and the liquid transitivity, which provide the best environment for plants respiration, which comprises polyesters, natural pulps and/or synthetic pulps such as polyolefin pulps, from which plants can absorb the amount of the elements necessary for the plant growth as much as plants want whenever plants want, and which provide the cultivation environment to accelerate the plant growth, and the plant cultivation methods by using the materials can be provided.

18 Claims, 1 Drawing Sheet

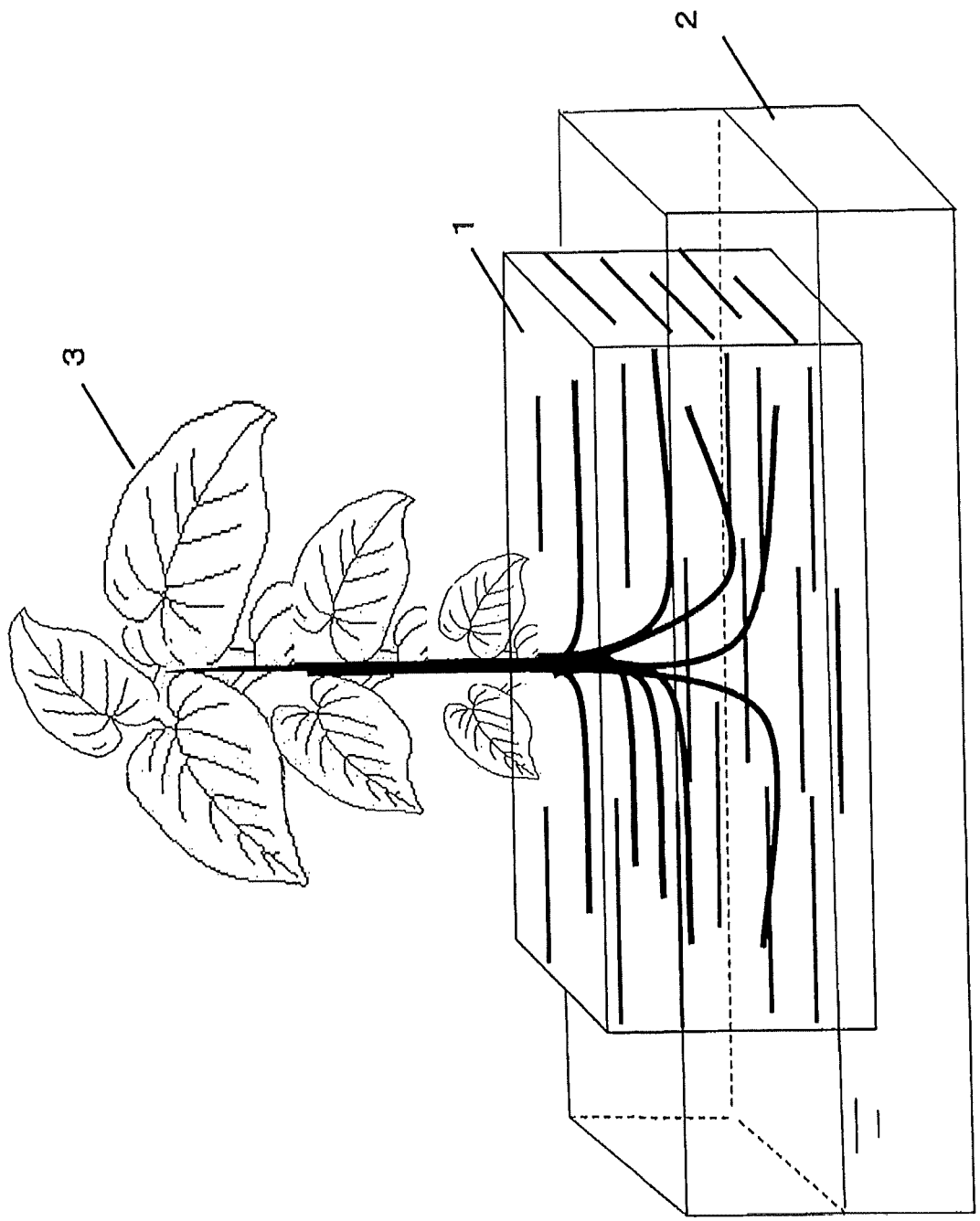

PLANT CULTIVATION MATERIAL AND PLANT CULTIVATION METHOD USING THE MATERIAL

TECHNICAL FIELD

This invention relates to plant cultivation materials and plant cultivation methods using the materials.

BACKGROUND ART

To date, a large number of plant cultivation methods to accelerate the plant growth such as the methods utilizing superabsorbent polymers represented by crosslinked sodium polyacrylate gels (Patent Literature 1), foamable resins represented by polyvinyl alcohols, polyurethanes and polystyrenes (Patent Literature 2), and breathable films and porous films represented by non-woven fabrics, or multi films (Patent Literature 3 and Patent Literature 4) have been reported.

But the cases that the amount of water or a nutrient solution required depending on the plant growth cannot be supplied have been observed in the cultivation method utilizing superabsorbent polymers, the cases that the air necessary for the plant growth cannot be sufficiently supplied have been observed in the cultivation method utilizing formable resins, and the cases that the amount of water or a nutrient solution necessary for the plant growth cannot be retained and therefore stably supplied to plants have been observed in the cultivation method utilizing breathable films or porous films.

A cultivation method utilizing ceramics (Patent Literature 5) was discovered in order to solve the aforementioned problems. But the capability of this method to supply to plants the amount of water or a nutrient solution necessary for the plant growth has been still insufficient, and thus, no plant cultivation environment for plants to absorb the amounts of the elements necessary for the plant growth as much as plants want whenever plants want has not been provided yet.

REFERENCE LIST

Patent Literature

Patent Literature 1: WO97/008938A
Patent Literature 2: Japanese Patent Laid-Open No. 2001-45895
Patent Literature 3: Japanese Patent Laid-Open No. 2006-217874
Patent Literature 4: Japanese Patent Laid-Open No. 2009-153398
Patent Literature 5: Japanese Patent No. 3044006

SUMMARY OF INVENTION

Technical Problems to be Solved by the Invention

The challenge to be solved by this invention is to provide plant cultivation materials suitable to make a plant cultivation environment in which plants can absorb the amount of the elements necessary for the plant growth as much as plants want whenever plants want in order to accelerate the plant growth and a plant cultivation methods using these materials.

Means for Solving the Problems

As a result of intensive studies to solve the aforementioned challenge, the inventors have discovered that the materials having the liquid retentivity and the liquid transitivity, and comprising a structure capable to provide the environment suitable for the plant respiration for the plant growth can accelerate the plant growth, since plants can absorb, from the materials, the amount of the elements necessary for the plant growth as much as plant want whenever plants want.

This invention to solve the aforementioned challenge is as follows:
(1) A plant cultivation material, from which plants can absorb the amount of the elements necessary for the plant growth as much as plants want whenever plants want, and which provides a cultivation environment to accelerate the plant growth.
(2) A plant cultivation material, which has the liquid retentivity and the liquid transitivity, from which plants can absorb the amount of the elements necessary for the plant growth as much as plants want whenever plants want, and which provides the cultivation environment to accelerate the plant growth.
(3) A plant cultivation material, which is capable to retain water, a nutrient solution and/or the liquid dissolving agrochemical products (which is described as "Liquid" hereinafter), which has the cavities for the smooth transitivity of Liquid, from which plants can absorb the amounts of the elements necessary for the plant growth as much as plants want whenever plants want, and which provides the cultivation environment to accelerate the plant growth.
(4) A plant cultivation material, which is capable to retain water a nutrient solution and/or the liquid dissolving agrochemical products, which has the cavities for the smooth transitivity of Liquid, which comprises the layered structure capable to control the root growth, from which plants can absorb the amount of the elements necessary for the plant growth as much as plants want whenever plants want, and which provides the cultivation environment to accelerate the plant growth.
(5) A plant cultivation material, which is capable to retain water, a nutrient solution and/or the liquid dissolving agrochemical products, which has the cavities for the smooth transitivity of Liquid, which comprises the layered structure capable to control the root growth so that roots can respire sufficient air, from which plants can absorb the amounts of the elements necessary for the plant growth as much as plants want whenever plants want, and which provides the cultivation environment to accelerate the plant growth.
(6) A plant cultivation method using the plant cultivation materials according to any one of (1) to (5).

Effects of Invention

The plant growth is made accelerated, the crop yield and the quality are made higher, and the supply of the elements necessary for the plant growth can be controlled to the minimum required, since plants can absorb the amounts of the elements necessary for the plant growth as much as plants want whenever plants want by utilizing the plant cultivation materials and the plant cultivation methods using the materials of this invention.

BRIEF DESCRIPTION OF DRAWINGS

FIG. 1 is a schematic view showing a plant cultivation using the plant cultivation materials of this invention.

DESCRIPTION OF EMBODIMENTS

Hereinafter, this invention will be described in detail.
This invention provides the plant cultivation materials which have the liquid retentivity and the liquid transitivity for plants to absorb the amounts of the elements necessary for the plant growth as much as plants want whenever plants want and which comprise a structure capable to provide the environment suitable for plant respiration (which is described as "Materials" hereinafter) and the plant cultivation methods using Materials.

The term "Materials" indicates the materials described as any one of (1) to (6), for example, the materials that comprise only one of materials or the materials at any given ratio mixed with two or more of the materials which are synthetic pulps produced from polyolefins such as polyethylenes and polypropylenes, natural pulps, and/or polyesters and so on. Examples of the synthetic pulps include those described in Japanese Patent No. 3913421 or Japanese Patent Laid-Open No. 2007-077519 or those produced by the method described in Japanese Patent Laid-Open No. 1260/1978, but are not limited thereto. For example, the materials formed into mono-layered or multi-layered sheet and/or something like this by using a slurry prepared only by one of the materials or at any given ratio mixed with two or more of materials which are synthetic pulps, natural pulps, polyesters and so on can be used.

Hereinafter, the terms used in the embodiments of this invention will be described.

(Plants)

The term "plant(s)" is used herein to mean various plants including plants of Malveceae such as cotton, plants of Chenopodiaceae such as sugar beet, plants of Brassicaceae such as rapeseed and cabbage, plants of Poaceae such as corn, wheat and rice, plants of Cucurbitaceae such as cucumber and pumpkin, plants of Asteraceae such as lettuce and safflower, plants of Apiaceae such as carrot, plants of Euphorbiaceae such as castor bean and cassava, plants of Solanaceae such as eggplant and tomato, plants of Rosaceae such as strawberry and apple, plants of Fabaceae such as soybean, and plants of Rutaceae such as orange and lemon, but are not limited thereto.

(Seeds)

The term "seed(s)" is used herein to mean the disseminules produced by the sexual reproduction of spermatophytes, which contain therein the embryos that are young plants growing from fertilized eggs, and also used to mean the artificial seeds which are the adventive embryos obtained by tissue cultures and embedded with gelatins, resins or something like those.

(Seedling)

The term "seedling" is used herein to mean the plant bodies having roots, stems and leaves, or the fragments of the plant bodies that are lack of one or two of roots, stems and/or leaves and able to be regenerated to complete plant bodies by curing.

(Cultivation)

The term "cultivation" is used herein to mean to artificially grow plants in any stage from the seeding stage to the maturation stage thereof. For example, it is used to mean to artificially grow plants over the entire or in a partial period from the seeding stage to the maturation stage and in each following stage or in the stages by the combination of two or more of the following stages:

(1) From the seeding stage to the maturation stage;
(2) From nursery plants to the maturation stage;
(3) From seeds to nursery plants;
(4) From the stage when plants are cultivated in the other places through the nursery plants before the desired maturation to the desired maturation stage.
(5) From nursery plants to the stage before the desired maturation (Plants are cultivated in the other places after the stage before the desired maturation to the desired maturation stage.)

The cultivation until the maturation stage includes the maturation stage in which the desired plant bodies or one of parts of fruits, flowers, leaves, buds, branches, stems, roots and bulbs of the plant bodies are at least made available to be harvested, or in which seeds or nursery plants are made available to be harvested from the plant bodies.

(Germination)

The term "germination" is used herein to mean that leaves, stems and/or roots and so on are growing from the inside or the surface of seeds, bulblets, bulb, and so on.

(Acceleration)

The term "acceleration" is used herein to mean the superior plant growth to those by conventional technologies, for example, faster growing, higher germination rate, higher survival rate, larger amount of plant bodies, higher crop yield, higher quality such as higher sugar content and so on.

(Elements Necessary for the Plant Growth)

The term "elements necessary for the plant growth" is used herein to mean the elements essential for the plant growth such as water, fertilizers and air, and the elements required to control insects and/or diseases harmful to the plant growth such as agrochemical products. But the elements are not limited thereto. (These elements are described as "Element(s)" hereinafter.)

(Absorb as Much as Plants want Whenever Plants want)

The term "absorb as much as plants want whenever plants want" is used herein to mean that plants absorbing Elements as much as plants want whenever plants want, that is, absorbing Elements depends on the plants themselves.

(Liquid Retentivity)

The term "liquid retentivity" is used herein to mean the property to retain the liquid containing Elements in Materials. The preferable retention rate is 30% or more and 95% or less as a liquid content (by weight) in Materials containing the liquid, and the more preferable retention rate is 40% or more, and 80% or less.

(Liquid Transitivity)

The term "liquid transitivity" is used herein to mean the property to easily transfer the liquid containing Elements in Materials. The preferable transfer rate is 0.01 mL/h or more per 1 $cm^3$ of Materials, and the more preferable transfer rate is 0.1 mL/h or more per 1 $cm^3$ of Materials.

(Fertilizers)

The term "fertilizers" is used herein to mean the nutrients essential for the plant growth, and used to mean the nutrients containing at least one of three fertilizer elements which consist of nitrogen, phosphoric acid and potassium, and being liquid forms or the liquid prepared by dissolving solid fertilizers in water (including emulsion-forms, suspension-forms and so on), (which is described as a "Nutrient Solutions" hereinafter).

The examples of Nutrient Solutions are nitrogen fertilizers such as ammonium sulfate, ammonium chloride, ammonium nitrate, urea, lime nitrogen and potassium nitrate, phosphate fertilizers such as superphosphate of lime, double or triple superphosphate and fused phosphate, potash fertilizers such as potassium chloride and potassium sulfate, chemical fertilizers such as mono-fertilizers, a chemical fertilizer and mixed fertilizers, calcareous fertilizers such as burnt lime, slaked lime and calcium carbonate fertilizers, silicate fertilizers such as slag silicate fertilizers, manganese fertilizers such as manganese sulfate fertilizers and slag manganese fertilizers, boric acid fertilizers such as borate fertilizers, trace element composite fertilizers such as fused trace element composite fertilizers, and mixed fertilizers which are the mixtures of the aforementioned fertilizers or the mixtures with the following agrochemical products, but not limited thereto. One, or two or more selected from the aforementioned fertilizers can be used as the ingredient(s) of Nutrient Solutions as desired.

(Agrochemical Products)

The term "agrochemical products" is used herein to mean the agents required to control insects and/or diseases harmful to the plant growth, and used to mean the liquid forms or the liquid prepared by dissolving solid agrochemical products in water (including emulsion-forms, suspension-forms and so on).

The agrochemical products include insecticides, acaricides, nematicides, fungicides, herbicides, and plant growth regulators, which types are single formulated products and mixed formulated products. The single formulated products mean the agrochemical products containing single active ingredient and the mixed formulated products mean the agrochemical products arbitrarily mixed with two or more active ingredients of insecticides, acaricides, nematicides, fungicides and herbicides described below, but are not limited thereto.

The examples of the active ingredients of insecticides, acaricides or nematicides are organophosphates such as acephate and fenitrothion, carbamates such as methomyl and benfuracarb, pyrazoles such as fipronil, neonicotinoids such as imidacloprid and dinotefuran, natural products such as milbemectin and spinosad, and the other active ingredients of insecticides, acaricides or nematicides having systemic or water soluble properties such as chlorantraniliprole and cyantraniliprole, but are not limited thereto.

The examples of the active ingredients of fungicides are carbamates such as thiuram and mancozeb, strobilurins such as azoxystrobin and kresoxim-methyl, azoles such as triflumizole, tebuconazole and simeconazole, natural products such as kasugamycin and streptomycin, and the other active ingredients of fungicides having systemic or water soluble properties, but are not limited thereto.

The examples of the active ingredients of herbicides or a plant growth regulators are phosphates such as glyphosate and glufosinate, sulfonylureas such as thifensulfuron methyl, inorganics such as ammonium nitrate and ammonium sulfate, triketones such as sulcotrione and mesotrione, pyrazolates such as pyrazolate and pyrasulfotole, triazolones such as sulfentrazone and amicarbazone, isoxazoles such as isoxachlortole, natural products such as cytokinin and gibberellin, and the other active ingredients of herbicides or plant growth regulators having systemic or water soluble properties, but are not limited thereto.

Additionally, the term "systemic property" is used herein to mean the property that the agrochemical products are absorbed from the roots, stems or leaves of the plants and then transferred into the plant bodies.

(Cavities)

The term "cavities" is used herein to mean the spaces through which the liquid containing Elements is transferred in Materials, whose size for seeds not to fall down, and which have the liquid transitivity caused by surface tension and capillary action inside of the cavities. In particular, it is preferable that 10 µmφ or less of cavities occupy 50% or more (relative to volume) of the total cavities existing in Materials, and it is more preferable that 10 µmφ or less of the cavities occupy 90% or more (relative to volume) of the total cavities existing in Materials.

(Control of Root Growth)

The term "control of root growth" is used herein to mean the methods to allow the plant roots to grow in a state suitable for the plant growth inside or outside of Materials and to create the environment of the roots by which plants can absorb Elements as much as plants want whenever plants want. This is caused by the layered structure of Materials.

(Layered Structure)

The term "layered structure" is used herein to mean a three-dimensional structure formed by laminating a planar structure on the other planar structure(s) in a layer thickness direction (a direction that intersects to a planar structure consisting of each layer), wherein, the planar structures are formed by continuously or discontinuously intertwining the materials constituting Materials in a two-dimensional manner. The preferable thickness of each layer is 0.01 mm or more, and the more preferable thickness is 0.1 mm or more. The preferable number of layers is two or more. The preferable thickness of Materials as a whole is 5,000 m or less, and the more preferable thickness is 500 m or less.

(Cultivation Methods)

According to the plant cultivation methods using Materials, plants can be cultivated over any given stages ranging from seeding to the maturation stage using Materials that can supply to plants the elements necessary for the plant growth. Such any given stages ranging from seeding to the maturation stage are as described in the aforesection "Cultivation".

The shape and the size of Materials are not particularly limited, but can be selected as appropriate depending on the plant growth to keep the plant growth direction and the root swelling better until the maturation stage of the target plants. For example, Materials can be used in various shapes such as sheet-forms, mat-forms, cube-forms and/or cuboid-forms, and column-forms, at least to ensure the surface of Materials for seeding and the parts of Materials for the root growth.

The places on which Materials are put can be selected as appropriate depending on the purpose of plant cultivation. For example, Materials are put in the container depending on the cultivation purposes, and then, plants can be cultivated until the maturation stage thereof after seeding on Materials under the condition available to supply to plants the elements necessary for the plant growth.

The elements necessary for the plant growth can be supplied to Materials put in the containers by several methods such as the method of transferring the elements filled in the containers to Materials, the method of using the elements previously filled in Materials and the method by the parallel use of these methods.

For example, Elements can be supplied to the plants by Liquid penetrable in Materials being filled in the container, by Materials being contacted with Liquid, and by Liquid being penetrated in Materials. Liquid is available to be replenished the containers with when required, and able to be replenished the container with continuously or at intervals.

As schematically shown in FIG. 1, plants can be grown on Materials 1 by cuboid-shaped Materials 1 being partially immersed in Liquid in the container 2 and by seeding on the upper surface of Materials 1 exposed to the air. Patterned indented structure, dents for seeding, or something like that can be laid on the seeding surface of Materials.

As shown in FIG. 1, plants grow in the layer thickness direction (in the vertical direction to the each layer) in case that Materials 1 have a layered structure. On the other hand, the steady rooting condition can be ensured for the stable cultivation states for plants by roots not only growing in the layer thickness direction of the layered structure but also effectively growing in the horizontal direction (in the direction perpendicular to the layer thickness direction and the direction along the planar structure of each layer). The relationship between the layer thickness direction in the layered structure of Materials and the plant growth direction is not limited to the relationship shown in FIG. 1, and can be controlled as appropriate so that the suitable cultivation condition for plants can be obtained. Moreover, as required, the supports for plants, the guides to support the plant growth directions or the supporting structures to fix the position of Materials 1 in the container can be also used.

The places on which the containers are put can be selected as appropriate depending on the purpose of plant cultivation, for example, in natural environments such as in the soils, cultivation chambers, houses, cultivation facilities and the others in which the cultivation conditions such as temperature and/or humidity and be controlled.

WORKING EXAMPLES

This invention will be specifically described by the following working examples. But these examples are not intended to limit the scope of this invention.

Example 1

Synthetic pulp (manufactured by Mitsui Chemicals, Inc.; SWP (Registered Trademark): E400) was prepared into a cuboid with a size of 80 mm×100 mm×65 mm (in height), and the cuboid was then floated on the liquid surface of water poured into a cultivation case. Wheat seeds were put on the upper surface of the synthetic pulp in order to observe the growth. The result of the growth is shown in Table 1.

TABLE 1

| Result of Wheat Growth (Seeding on Jan. 6, 2012) | | | | | | | | |
|---|---|---|---|---|---|---|---|---|
| Days after Seeding (days) | 3 | 6 | 9 | 13 | 14 | 21 | 27 | 30 |
| Height of Plants (mm) | Germination | 40 | 60 | 147 | 188 | 237 | 275 | 285 |
| Number of Leaves (pieces) | | 1 | 1 | 2 | 3 | 3 | 4 | 4 |
| Days after Seeding (days) | 35 | 37 | 41 | 43 | 51 | 63 | 69 | 72 |
| Height of Plants (mm) | 293 | 294 | 290 | 299 | 299 | 310 | 345 | 365 |
| Number of Leaves (pieces) | 5 | 5 | 5 | 5 | 7 | 7 | 7 | 7 |

Example 2

Synthetic pulp (manufactured by Mitsui Chemicals, Inc.; SWP (Registered Trademark): E400) was prepared into a cuboid with a size of 80 mm×100 mm×65 mm (in height), and the cuboid was then floated on the liquid surface of a nutrient solution (the composition is shown in Table 2) poured into a cultivation case. Wheat seeds were put on the upper surface of the synthetic pulp in order to observe the growth and to measure the amount of the nutrient solution consumed during the growth. The results of the growth and the amount of the nutrient solution consumption are shown in Table 3.

TABLE 2

| Composition of Nutrient Solution | | | |
|---|---|---|---|
| Ingredient | Concentration (mg/L) | Ingredient | Concentration (mg/L) |
| $Ca(NO_3)_2 \cdot 4H_2O$ | 472 | $ZnSO_4 \cdot 7H_2O$ | 0.22 |
| $KNO_3$ | 808 | $CuSO_4 \cdot 5H_2O$ | 0.08 |
| $NH_4H_2PO_4$ | 152 | $Na_2MoO_4 \cdot 2H_2O$ | 0.025 |
| $MgSO_4 \cdot 7H_2O$ | 492 | $MnSO_4 \cdot 5H_2O$ | 2.38 |
| $H_3BO_3$ | 2.86 | Fe-EDTA | 22.6 |

TABLE 3

Results of Wheat Growth and Amount of Nutrient Solution Consumption (Seeding on Nov. 15, 2011)

| Days after Seeding (days) | 2 | 3 | 6 | 9 | 13 | 14 | 21 | 23 |
|---|---|---|---|---|---|---|---|---|
| Height of Plants (mm) | | 5 | 45 | 120 | 165 | 200 | 280 | 290 |
| Number of Leaves (pieces) | | 1 | 1 | 2 | 3 | 3 | 5 | 6 |
| Growth Stage | Germination | | | | | | | |
| Integrated Amount of Nutrient Solution Consumption (mL) | | | | | | | 28 | |

| Days after Seeding (days) | 27 | 30 | 35 | 37 | 41 | 43 | 51 | 56 |
|---|---|---|---|---|---|---|---|---|
| Height of Plants (mm) | 330 | 335 | 390 | 405 | 419 | 428 | 450 | 450 |
| Number of Leaves (pieces) | 9 | 10 | 12 | 12 | 12 | 16 | 19 | 19 |
| Growth Stage | Active Tiller | | | | | | | Booting |
| Integrated Amount of Nutrient Solution Consumption (mL) | 72 | | 128 | | 184 | 234 | 289 | 333 |

| Days after Seeding (days) | 58 | 59 | 63 | 66 | 69 | 72 | 79 | 83 |
|---|---|---|---|---|---|---|---|---|
| Height of Plants (mm) | 452 | 465 | 470 | 518 | 520 | 558 | 600 | 635 |
| Number of Leaves (pieces) | 19 | 19 | 19 | 22 | 22 | 22 | 22 | 22 |
| Growth Stage | | | | | | | | |
| Integrated Amount of Nutrient Solution Consumption (mL) | | 377 | 432 | 471 | 527 | 555 | 599 | 677 |

| Days after Seeding (days) | 86 | 90 | 93 |
|---|---|---|---|
| Height of Plants (mm) | 638 | 638 | 661 |
| Number of Leaves (pieces) | 23 | 23 | 23 |
| Growth Stage | Ear emergence | | |
| Integrated Amount of Nutrient Solution Consumption (mL) | 744 | 800 | |

Example 3

Synthetic pulp (manufactured by Mitsui Chemicals, Inc.; SWP (registered trademark): E400) was prepared into a cuboid with a size of 300 mm×360 mm×100 mm (in height), and the cuboid was then floated on the liquid surface of a nutrient solution (the composition is shown in Table 4) poured into a cultivation case. Grape tomato seeds were put on the upper surface of the synthetic pulp in order to observe the growth and to measure the sugar content of fruitive grave tomato pulp by a hand-held refractometer IATC-1E (Brix: 0% to 32%) manufactured by Iuchi Seieido Co., Ltd. The results of the growth and the sugar content are shown in Table 5.

TABLE 4

Composition of Nutrient Solution

| Ingredient | Concentration (mg/L) | Ingredient | Concentration (mg/L) |
|---|---|---|---|
| $Ca(NO_3)_2 \cdot 4H_2O$ | 354 | $ZnSO_4 \cdot 7H_2O$ | 0.22 |
| $KNO_3$ | 404 | $CuSO_4 \cdot 5H_2O$ | 0.08 |
| $NH_4H_2PO_4$ | 76 | $Na_2MoO_4 \cdot 2H_2O$ | 0.025 |
| $MgSO_4 \cdot 7H_2O$ | 246 | $MnSO_4 \cdot 5H_2O$ | 2.38 |
| $H_3BO_3$ | 2.86 | Fe-EDTA | 22.6 |

TABLE 5

Results of Grape Tomato Growth and Sugar Content (Seeding on Apr. 13, 2012)

| Days after Seeding (days) | 5 | 18 | 28 | 32 | 52 | 60 | 69 | 76 |
|---|---|---|---|---|---|---|---|---|
| Height of Plants (mm) | Germination | 30 | 55 | 72 | 215 | 355 | 480 | 640 |
| Number of Flower Buds (pieces) | | | | | 3 | 12 | 14 | 47 |
| Number of Fruit-Setting (pieces) | | | | | | | | 1 |

| Days after Seeding (days) | 84 | 87 | 90 | 98 | 108 | 119 | 132 | 167 |
|---|---|---|---|---|---|---|---|---|
| Height of Plants (mm) | 830 | 860 | 1,000 | 1,270 | 1,500 | 1,800 | 2,250 | |
| Number of Flower Buds (pieces) | 93 | 94 | 114 | 185 | 166 | 155 | 142 | |
| Number of Fruit-Setting (pieces) | 7 | 7 | 11 | 24 | 56 | 131 | 199 | |
| Sugar Content (Brix, %) | | | | | | | | 14.0 |

Examples 4 to 14

Leaf lettuce, rapeseed, *myosotis*, corn poppy, *prunus sargentii*, camphor laurel, silk tree, nigella, coriander, soybeans and red *perilla* were seeded by the similar method to that described in Example 2 in order to observe each plant growth and to measure each amount of the nutrient solution consumed during each growth. The results of each growth and each amount of the nutrient solution consumption are shown in Tables 6 to 16.

TABLE 6

Results of Leaf Lettuce Growth and Amount of Nutrient Solution Consumption (Seeding on Nov. 15, 2011)

| | Days after Seeding (days) | | | | | | | |
|---|---|---|---|---|---|---|---|---|
| | 2 | 3 | 6 | 9 | 13 | 14 | 21 | 23 |
| Height of Plants (mm) | Germination | 5 | 5 | 8 | 20 | 27 | 45 | 53 |
| Number of Leaves (pieces) | | 2 | 3 | 3 | 4 | 4 | 5 | 6 |
| Integrated Amount of Nutrient Solution Consumption (mL) | | | | | | | | |

| | Days after Seeding (days) | | | | | | | |
|---|---|---|---|---|---|---|---|---|
| | 27 | 30 | 35 | 41 | 43 | 51 | 56 | 58 |
| Height of Plants (mm) | 70 | 80 | 110 | 139 | 152 | 190 | 200 | 212 |
| Number of Leaves (pieces) | 7 | 7 | 8 | 9 | 11 | 12 | 13 | 13 |
| Integrated Amount of Nutrient Solution Consumption (mL) | | | | 60 | 80 | 140 | 220 | |

| | Days after Seeding (days) | | | | | | | |
|---|---|---|---|---|---|---|---|---|
| | 59 | 63 | 66 | 69 | 72 | 79 | 83 | 86 |
| Height of Plants (mm) | 220 | 220 | 235 | 239 | 249 | 252 | 268 | 268 |
| Number of Leaves (pieces) | 13 | 15 | 15 | 15 | 15 | 16 | 16 | 16 |
| Integrated Amount of Nutrient Solution Consumption (mL) | 260 | 320 | 400 | 480 | 530 | 590 | 690 | 740 |

| | Days after Seeding (days) | |
|---|---|---|
| | 90 | 93 |
| Height of Plants (mm) | 268 | 268 |
| Number of Leaves (pieces) | 16 | 16 |
| Integrated Amount of Nutrient Solution Consumption (mL) | 860 | |

TABLE 7

Results of Rapeseed Growth and Amount of Nutrient Solution Consumption (Seeding on Nov. 15, 2011)

| Days after Seeding (days) | 2 | 3 | 6 | 9 | 13 | 14 | 21 | 23 |
|---|---|---|---|---|---|---|---|---|
| Height of Plants (mm) | Germination | 10 | 17 | 20 | 30 | 33 | 60 | 65 |
| Number of Leaves (pieces) | | 2 | 2 | 3 | 4 | 4 | 5 | 5 |
| Integrated Amount of Nutrient Solution Consumption (mL) | | | | | | | | |

| Days after Seeding (days) | 27 | 30 | 35 | 41 | 43 | 51 | 56 | 58 |
|---|---|---|---|---|---|---|---|---|
| Height of Plants (mm) | 78 | 84 | 110 | 141 | 156 | 215 | 245 | 250 |
| Number of Leaves (pieces) | 6 | 6 | 7 | 9 | 10 | 11 | 11 | 11 |
| Integrated Amount of Nutrient Solution Consumption (mL) | | | | 67 | | 109 | 159 | |

| Days after Seeding (days) | 59 | 63 | 66 | 69 | 72 | 79 | 83 | 86 |
|---|---|---|---|---|---|---|---|---|
| Height of Plants (mm) | 250 | 254 | 285 | 315 | 329 | 360 | 366 | 367 |
| Number of Leaves (pieces) | 11 | 13 | 13 | 13 | 13 | 16 | 16 | 16 |
| Integrated Amount of Nutrient Solution Consumption (mL) | 192 | 225 | 275 | 325 | 375 | 425 | 542 | 592 |

| Days after Seeding (days) | 90 |
|---|---|
| Height of Plants (mm) | 367 |
| Number of Leaves (pieces) | 16 |
| Integrated Amount of Nutrient Solution Consumption (mL) | 717 |

TABLE 8

Results of *Myosotis* Growth and Amount of Nutrient Solution Consumption (Seeding on Nov. 15, 2011)

| Days after Seeding (days) | 3 | 6 | 9 | 13 | 14 | 21 | 23 | 27 |
|---|---|---|---|---|---|---|---|---|
| Height of Plants (mm) | Germination | 5 | 6 | 15 | 17 | 32 | 40 | 56 |
| Number of Leaves (pieces) |  | 2 | 2 | 4 | 4 | 6 | 6 | 7 |
| Integrated Amount of Nutrient Solution Consumption (mL) |  |  |  |  |  |  |  |  |

| Days after Seeding (days) | 30 | 35 | 41 | 43 | 51 | 56 | 58 | 59 |
|---|---|---|---|---|---|---|---|---|
| Height of Plants (mm) | 62 | 83 | 107 | 115 | 145 | 155 | 155 | 159 |
| Number of Leaves (pieces) | 7 | 10 | 10 | 18 | 19 | 19 | 22 | 24 |
| Integrated Amount of Nutrient Solution Consumption (mL) |  |  | 31 | 44 | 60 | 98 |  |  |

| Days after Seeding (days) | 63 | 66 | 69 | 72 | 79 | 83 | 86 | 90 |
|---|---|---|---|---|---|---|---|---|
| Height of Plants (mm) | 161 | 163 | 163 | 168 | 173 | 180 | 180 | 180 |
| Number of Leaves (pieces) | 27 | 27 | 27 | 34 | 34 | 34 | 34 | 34 |
| Integrated Amount of Nutrient Solution Consumption (mL) | 136 |  | 180 | 205 | 255 | 293 | 324 | 362 |

| Days after Seeding (days) | 93 |
|---|---|
| Height of Plants (mm) | 180 |
| Number of Leaves (pieces) | 34 |
| Integrated Amount of Nutrient Solution Consumption (mL) |  |

TABLE 9

Results of Corn Poppy Growth and Amount of Nutrient Solution Consumption (Seeding on Nov. 15, 2011)

| | Days after Seeding (days) | | | | | | | |
|---|---|---|---|---|---|---|---|---|
| | 2 | 3 | 6 | 9 | 13 | 14 | 21 | 23 |
| Height of Plants (mm) | Germination | 3 | 8 | 10 | 10 | 12 | 22 | 29 |
| Number of Leaves (pieces) |  | 2 | 2 | 4 | 4 | 6 | 9 | 9 |
| Integrated Amount of Nutrient Solution Consumption (mL) |  |  |  |  |  |  |  |  |

| | Days after Seeding (days) | | | | | | | |
|---|---|---|---|---|---|---|---|---|
| | 27 | 30 | 35 | 41 | 43 | 51 | 56 | 58 |
| Height of Plants (mm) | 38 | 49 | 74 | 95 | 103 | 144 | 160 | 165 |
| Number of Leaves (pieces) | 10 | 13 | 17 | 17 | 18 | 21 | 24 | 26 |
| Integrated Amount of Nutrient Solution Consumption (mL) |  |  |  | 100 |  | 200 | 250 |  |

TABLE 9-continued

Results of Corn Poppy Growth and Amount of Nutrient Solution Consumption (Seeding on Nov. 15, 2011)

| | Days after Seeding (days) | | | | | | | |
|---|---|---|---|---|---|---|---|---|
| | 59 | 63 | 66 | 69 | 72 | 79 | 83 | 86 |
| Height of Plants (mm) | 165 | 165 | 178 | 189 | 190 | 207 | 207 | 212 |
| Number of Leaves (pieces) | 26 | 26 | 26 | 26 | 31 | 31 | 31 | 31 |
| Integrated Amount of Nutrient Solution Consumption (mL) |  | 400 |  | 550 | 650 | 875 | 1,000 | 1,150 |

| | Days after Seeding (days) | |
|---|---|---|
| | 90 | 93 |
| Height of Plants (mm) | 224 | 248 |
| Number of Leaves (pieces) | 31 | 31 |
| Integrated Amount of Nutrient Solution Consumption (mL) | 1,300 |  |

TABLE 10

Results of *Prunus Sargentii* Growth and Amount of Nutrient Solution Consumption (Seeding on Nov. 15, 2011)

| Days after Seeding (days) | 1 | 6 | 9 | 13 | 14 | 21 | 23 | 27 |
|---|---|---|---|---|---|---|---|---|
| Height of Plants (mm) | Germination | 15 | 43 | 80 | 95 | 119 | 130 | 132 |
| Number of Leaves (pieces) |  | 2 | 5 | 6 | 6 | 7 | 8 | 9 |

TABLE 10-continued

Results of *Prunus Sargentii* Growth and Amount of Nutrient Solution Consumption (Seeding on Nov. 15, 2011)

| | | | | | | | | |
|---|---|---|---|---|---|---|---|---|
| Integrated Amount of Nutrient Solution Consumption (mL) | | | | | | | 40 | 80 |
| Days after Seeding (days) | 30 | 35 | 41 | 43 | 51 | 56 | 58 | 59 |
| Height of Plants (mm) | 138 | 162 | 190 | 205 | 242 | 256 | 268 | 276 |
| Number of Leaves (pieces) | 9 | 11 | 12 | 12 | 14 | 16 | 16 | 16 |
| Integrated Amount of Nutrient Solution Consumption (mL) | | | 140 | 160 | 200 | 240 | | |
| Days after Seeding (days) | 63 | 66 | 69 | 72 | 79 | 83 | 86 | 90 |
| Height of Plants (mm) | 295 | 310 | 323 | 340 | 372 | 390 | 390 | 390 |
| Number of Leaves (pieces) | 17 | 17 | 17 | 19 | 19 | 19 | 19 | 19 |
| Integrated Amount of Nutrient Solution Consumption (mL) | 290 | 330 | 370 | 420 | 450 | 500 | 550 | 620 |
| Days after Seeding (days) | 93 | | | | | | | |
| Height of Plants (mm) | 419 | | | | | | | |
| Number of Leaves (pieces) | 19 | | | | | | | |
| Integrated Amount of Nutrient Solution Consumption (mL) | | | | | | | | |

TABLE 11

Result of Camphor Tree Growth (Seeding on Nov. 15, 2011)

| Days after Seeding days) | 1 | 2 | 3 | 6 | 9 | 13 | 14 | 21 |
|---|---|---|---|---|---|---|---|---|
| Height of Plants (mm) | Germination | 20 | 22 | 30 | 30 | 30 | 30 | 32 |
| Number of Leaves (pieces) | | 1 | 1 | 1 | 1 | 2 | 3 | 4 |
| Days after Seeding days) | 23 | 27 | 30 | 35 | 41 | 43 | 51 | 56 |
| Height of Plants (mm) | 32 | 32 | 32 | 32 | 32 | 32 | 32 | 32 |
| Number of Leaves (pieces) | 4 | 4 | 4 | 4 | 4 | 4 | 4 | 4 |
| Days after Seeding days) | 58 | 59 | 63 | 66 | 69 | 72 | 79 | 83 |
| Height of Plants (mm) | 32 | 33 | 33 | 33 | 33 | 33 | 33 | 33 |
| Number of Leaves (pieces) | 4 | 4 | 4 | 4 | 4 | 4 | 4 | 4 |
| Days after Seeding days) | 86 | 90 | 93 | | | | | |
| Height of Plants (mm) | 33 | 33 | 33 | | | | | |
| Number of Leaves (pieces) | 4 | 4 | 4 | | | | | |

TABLE 12

Results of Silk Tree Growth and Amount of Nutrient Solution Consumption (Seeding on Nov. 15, 2011)

| Days after Seeding (days) | 3 | 9 | 13 | 14 | 21 | 23 | 27 | 30 |
|---|---|---|---|---|---|---|---|---|
| Height of Plants (mm) | Germination | 25 | 28 | 45 | 53 | 55 | 55 | 55 |
| Number of Leaves (pieces) | | 4 | 5 | 5 | 6 | 6 | 6 | 6 |
| Integrated Amount of Nutrient Solution Consumption (mL) | | | | | 100 | | | |
| Days after Seeding (days) | 35 | 41 | 43 | 51 | 56 | 58 | 59 | 63 |
| Height of Plants (mm) | 55 | 55 | 55 | 55 | 55 | 55 | 55 | 55 |
| Number of Leaves (pieces) | 7 | 7 | 7 | 7 | 7 | 7 | 7 | 7 |
| Integrated Amount of Nutrient Solution Consumption (mL) | 250 | | | | | | 500 | |

TABLE 12-continued

Results of Silk Tree Growth and Amount of Nutrient
Solution Consumption (Seeding on Nov. 15, 2011)

| Days after Seeding (days) | 66 | 69 | 72 | 79 | 83 | 86 | 90 | 93 |
|---|---|---|---|---|---|---|---|---|
| Height of Plants (mm) | 55 | 55 | 55 | 55 | 55 | 55 | 55 | 55 |
| Number of Leaves (pieces) | 7 | 8 | 8 | 8 | 8 | 8 | 8 | 8 |
| Integrated Amount of Nutrient Solution Consumption (mL) | | | | | 750 | | | |

TABLE 13

Results of *Negella* Growth and Amount of Nutrient
Solution Consumption (Seeding on Dec. 13, 2011)

| Days after Seeding (days) | 2 | 6 | 13 | 14 | 23 | 27 | 30 | 35 |
|---|---|---|---|---|---|---|---|---|
| Height of Plants (mm) | Germination | 10 | 33 | 42 | 47 | 50 | 51 | 51 |
| Number of Leaves (pieces) | | 2 | 2 | 2 | 3 | 3 | 3 | 4 |
| Integrated Amount of Nutrient Solution Consumption (mL) | | | | | | 50 | | 138 |

| Days after Seeding (days) | 41 | 43 | 51 | 56 | 58 | 63 | 66 | 69 |
|---|---|---|---|---|---|---|---|---|
| Height of Plants (mm) | 67 | 75 | 80 | 94 | 97 | 95 | 105 | 109 |
| Number of Leaves (pieces) | 5 | 5 | 6 | 6 | 7 | 7 | 8 | 8 |
| Integrated Amount of Nutrient Solution Consumption (mL) | | 176 | | 264 | | | 339 | |

TABLE 14

Results of Coriander Growth and Amount of Nutrient
Solution Consumption (Seeding on Dec. 13. 2011)

| Days after Seeding (days) | 6 | 13 | 14 | 23 | 27 | 30 | 35 | 41 |
|---|---|---|---|---|---|---|---|---|
| Height of Plants (mm) | Germination | 41 | 48 | 50 | 53 | 53 | 57 | 65 |
| Number of Leaves (pieces) | | 2 | 3 | 4 | 5 | 5 | 6 | 7 |
| Integrated Amount of Nutrient Solution Consumption (mL) | | | | | 100 | | 275 | |

| Days after Seeding (days) | 43 | 51 | 56 | 58 | 63 | 66 | 69 |
|---|---|---|---|---|---|---|---|
| Height of Plants (mm) | 77 | 85 | 120 | 132 | 138 | 156 | 161 |
| Number of Leaves (pieces) | 7 | 10 | 10 | 13 | 14 | 15 | 15 |
| Integrated Amount of Nutrient Solution Consumption (mL) | 350 | | 500 | | | 625 | |

TABLE 15

Results of Soybeans Growth and Amount of Nutrient
Solution Consumption (Seeding on Jan. 6, 2012)

| Days after Seeding (days) | 3 | 14 | 23 | 27 | 30 | 35 | 41 | 43 |
|---|---|---|---|---|---|---|---|---|
| Height of Plants (mm) | Germination | 25 | 67 | 129 | 160 | 168 | 175 | 200 |
| Number of Leaves (pieces) | | 3 | 6 | 7 | 7 | 8 | 10 | 10 |
| Integrated Amount of Nutrient Solution Consumption (mL) | | | 75 | 200 | | 325 | 475 | |

| Days after Seeding (days) | 51 | 56 | 59 | 63 | 66 | 69 | 72 | 79 |
|---|---|---|---|---|---|---|---|---|
| Height of Plants (mm) | 212 | 223 | 223 | 235 | 240 | 240 | 240 | 240 |
| Number of Leaves (pieces) | 22 | 28 | 37 | 38 | 38 | 38 | 38 | 38 |
| Integrated Amount of Nutrient Solution Consumption (mL) | 700 | 775 | | 1,025 | 1,225 | 1,325 | 1,475 | 1,625 |

TABLE 16

Result of Red Perilla Growth (Seeding on Oct. 1, 2012)

| | Days after Seeding (days) | | | | | | |
|---|---|---|---|---|---|---|---|
| | 4 | 11 | 18 | 25 | 32 | 38 | 46 | 62 |
| Height of Plants (mm) | Germination | 5 | 7 | 9 | 10 | 20 | 50 | 65 |
| Number of Leaves (pieces) | | | 2 | 4 | 4 | 6 | 6 | 8 | 12 |

| | Days after Seeding (days) | | | | | |
|---|---|---|---|---|---|---|
| | 68 | 75 | 82 | 91 | 96 | 104 |
| Height of Plants (mm) | 80 | 115 | 130 | 160 | 170 | 185 |
| Number of Leaves (pieces) | 12 | 12 | 14 | 14 | 14 | 20 |

Example 15

Synthetic pulp (manufactured by Mitsui Chemicals, Inc.; SWP (Registered Trademark): E400) was prepared into a cuboid with a size of 65 mm×65 mm×95 mm (in height), and the cuboid was then floated on the liquid surface of a nutrient solution (the composition is shown in Table 2) poured into a cultivation case. *Dianthus* seeds were put on the upper surface of the synthetic pulp in order to observe the growth. The result of the growth is shown in Table 17.

TABLE 17

Result of Dianthus Growth (Seeding on Jul. 29, 2011)

| | Days after Seeding (days) | | | | | | |
|---|---|---|---|---|---|---|---|
| | 6 | 13 | 21 | 35 | 42 | 49 | 55 | 84 |
| Height of Plants (mm) | Germination | 10 | 45 | 70 | 75 | 80 | 80 | 95 |

Example 16

Synthetic pulp (manufactured by Mitsui Chemicals, Inc.; SWP (Registered Trademark): E400) was prepared into a cuboid with a size of 500 mm×340 mm×150 mm (in height), and the cuboid was then floated on the liquid surface of a nutrient solution (the composition is shown in Table 18) poured into a cultivation case. After a hole with a size sufficient to receive a seed therein was made on the upper surface of the synthetic pulp, a corn seed was then put in the hole in order to observe the growth until fruition. The result of the growth is shown in Table 19.

TABLE 18

Composition of Nutrient Solution

| Trade name | Concentration (mg/L) | Trade name | Concentration (mg/L) |
|---|---|---|---|
| Otsuka House No. 1 | 250 | Otsuka House No. 2 | 167 |
| Otsuka House No. 5 | 5 | | |

(Note)
Otsuka House: trade name of fertilizer produced and distributed by Otsuka AgriTechno Co., Ltd.

TABLE 19

Result of Corn Growth (Seeding on Jul. 29, 2011)

| | Days after Seeding (days) | | | | | |
|---|---|---|---|---|---|---|
| | 4 | 14 | 31 | 43 | 49 | 71 |
| Height of Plants (mm) | Germination | 320 | 850 | 114 | 125 | 130 |
| Growth Stage | | | | Blooming of Male Flower | Blooming of Female Flower | Fruition |

Example 17

Synthetic pulp (manufactured by Mitsui Chemicals, Inc.; SWP (Registered Trademark): E400) was prepared into a cuboid with a size of 260 mm×110 mm×150 mm (in height), and the cuboid was then floated on the liquid surface of a nutrient solution (the composition is shown in Table 18) poured into a cultivation case. After a hole with a size sufficient to receive a seed therein was made on the upper surface of the synthetic pulp, a paddy rice (Nihonbare) seed was then put in the hole in order to observe the growth until the maturation stage. The result of the growth is shown in Table 20.

TABLE 20

Result of Paddy Rice Growth (Seeding on Dec. 20, 2011)

| | Days after Seeding (days) | | | | | |
|---|---|---|---|---|---|---|
| | 4 | 14 | 31 | 38 | 49 | 71 | 114 |
| Height of Plants (mm) | Germination | 180 | 490 | 720 | 780 | 1,150 | 1,200 |
| Growth Stage | | | | | | Booting | Maturation |

Example 18

Synthetic pulp (manufactured by Mitsui Chemicals, Inc.; SWP (Registered Trademark): E400) was prepared into a cuboid with a size of 500 mm×340 mm×150 mm (in height), and the cuboid was then floated on the liquid surface of a nutrient solution (the composition is shown in Table 18) poured into a cultivation case. After a hole with a size sufficient to receive a seed therein was made on the upper surface of the synthetic pulp, a sorghum seed was then put in the hole in order to observe the growth until fruition. The result of the growth is shown in Table 21.

TABLE 21

Result of *Sorghum* Growth (Seeding on Dec. 20, 2011)

| | Days after Seeding (days) | | | |
|---|---|---|---|---|
| | 4 | 49 | 71 | 114 |
| Height of Plants (mm) | 4 | 1,030 | 1,280 | 1,300 |
| Growth Stage | Germination | | Ear Emergence | Fruition |

Example 19 to 20

Cotton and rapeseed were seeded by the similar method to that described in Example 18 in order to observe each plant growth. The results of each growth are shown in Tables 22 and 23.

TABLE 22

Result of Cotton Growth (Seeding on Dec. 20, 2011)

| | Days after Seeding (days) | | | | |
|---|---|---|---|---|---|
| | 10 | 67 | 87 | 207 | 307 |
| Height of Plants (mm) | Germination | 794 | 850 | 1,200 | 1,500 |
| Growth Stage | | Blooming | 9 Flower Buds | 14 Flower Buds | 26 Flower Buds |

TABLE 23

Result of Rapeseed Growth (Seeding on Dec. 20, 2011)

| | Days after Seeding (days) | | | | |
|---|---|---|---|---|---|
| | 6 | 66 | 98 | 121 | 161 |
| Height of Plants (mm) | Germination | 18 | 30 | 98 | 104 |
| Growth Stage | | | | Blooming | Fruition |

Example 21

Synthetic pulp (manufactured by Mitsui Chemicals, Inc.; SWP (registered trademark): E400) was prepared into a cuboid with a size of 400 mm×200 mm×5 mm (in height), and the cuboid was then floated on the liquid surface of a nutrient solution (the composition is shown in Table 18) poured into a cultivation case. Kentucky bluegrass seeds were put on the upper surface of the synthetic pulp in order to observe the growth. The result of the growth is shown in Table 24.

TABLE 24

Result of Kentucky Bluegrass Growth (Seeding on Jun. 4, 2012)

| | Days after Seeding (days) | | | |
|---|---|---|---|---|
| | 5 | 11 | 21 | 67 |
| Height of Plants (mm) | Germination | 15 | 60 | 200 |

Example 22

Synthetic paper manufactured by mixing natural pulp with synthetic pulp was prepared into a cuboid with a size of 80 mm×100 mm×65 mm (in height), and the cuboid was then floated on the liquid surface of a nutrient solution (the composition is shown in Table 2) poured into a cultivation case. Wheat seeds were put on the upper surface of the synthetic paper in order to observe the growth and to measure the amount of the nutrient solution consumed during the growth. The results of the growth and the amount of the nutrient solution consumption are shown in Table 25.

TABLE 25

Results of Wheat Growth and Amount of Nutrient Solution Consumption (Seeding on Aug. 27, 2011)

| | | Days after Seeding (days) | | | | | | |
|---|---|---|---|---|---|---|---|---|
| | | 3 | 8 | 14 | 23 | 35 | 49 | 56 | 72 |
| Height of Plants (mm) | Germination | 80 | 155 | 180 | 180 | 180 | 285 | 320 |
| Number of Leaves (pieces) | | | 1 | 2 | 3 | 4 | 6 | 7 | 8 |
| Integrated Amount of Nutrient Solution Consumption (mL) | | | | | 450 | | | | 950 |

Example 23

Natural pulp paper manufactured by processing natural pulp was prepared into a cuboid with a size of 80 mm×100 mm×65 mm (in height), and the cuboid was then floated on the liquid surface of a nutrient solution (the composition is shown in Table 2) poured into a cultivation case. Wheat seeds were put on the upper surface of the natural paper in order to observe the growth and to measure the amount of the nutrient solution consumed during the growth. The results of the growth and the amount of the nutrient solution consumption are shown in Table 26.

TABLE 26

Results of Wheat Growth and Amount of Nutrient Solution Consumption (Seeding on Aug. 27, 2011)

| | | Days after Seeding (days) | | | | | | |
|---|---|---|---|---|---|---|---|---|
| | | 3 | 8 | 14 | 20 | 27 | 34 | 41 | 48 |
| Height of Plants (mm) | Germination | 45 | 150 | 170 | 200 | 200 | 240 | 360 |
| Number of Leaves (pieces) | | | 1 | 2 | 3 | 4 | 5 | 6 | 7 |
| Integrated Amount of Nutrient Solution Consumption (mL) | | | | | 200 | | 350 | | 500 |

| | Days after Seeding (days) | | | |
|---|---|---|---|---|
| | 57 | 65 | 71 | 78 |
| Height of Plants (mm) | 440 | 440 | 440 | 440 |
| Number of Leaves (pieces) | 9 | 10 | 10 | 11 |
| Integrated Amount of Nutrient Solution Consumption (mL) | 650 | | 900 | 1,025 |

Example 24

Polyester paper manufactured by mixing polyester with natural pulp was prepared into a cuboid with a size of 80 mm×100 mm×65 mm (in height), and the cuboid was then floated on the liquid surface of a nutrient solution (the composition is shown in Table 2) poured in a cultivation case. Wheat seeds were put on the upper surface of the polyester paper in order to observe the growth and to measure the amount of the nutrient solution consumed during the growth. The results of the growth and the amount of the nutrient solution consumption are shown in Table 27.

TABLE 27

Results of Wheat Growth and Amount of Nutrient Solution Consumption (Seeding on Dec. 28, 2012)

| | Days after Seeding (days) | | | | | | | |
|---|---|---|---|---|---|---|---|---|
| | 4 | 12 | 20 | 25 | 34 | 41 | 48 | 53 |
| Height of Plants (mm) | Germination | 162 | 275 | 313 | 385 | 417 | 425 | 427 |
| Number of Leaves (pieces) | | 2 | 4 | 5 | 5 | 7 | 10 | 12 |
| Integrated Amount of Nutrient Solution Consumption (mL) | | 17 | 50 | 94 | 138 | 182 | 226 | 282 |

Plants that can be cultivated by the similar methods to those described in Examples 1, 2 and 16 are shown in Table 28. But the examples of the plants are not limited thereto.

TABLE 28

Plant List

| Family | Genus | Species | Plant Name |
|---|---|---|---|
| Malvaceae | Gossypium | | Cotton |
| | Hibiscus | H. cannabinus | Kenaf |
| | | | Hibiscus |
| | Abelmoschus | A. esculentus | Okra |
| Chenopodiaceae | Spinacia | S. oleracea | Spinach |
| | Beta | B. vulgaris | Sugar Beet |
| Rubiaceae | Gardenia | G. jasminoides | Common Gardenia |
| | Coffea | | Coffee Tree |
| Brassicaceae | Brassica | B. napus | Rapeseed |
| | | B. oleracea | Broccoli |
| | | | Cabbage |
| | | rapa | Turnip |
| | Raphanus | R. sativus | Japanese Radish |
| | Brassica | B. juncea | Leaf Mustard |
| Iridaceae | Crocus | | Crocus |
| Poaceae | Zea | Z. mays | Corn |
| | Oryza | O. sativa | Rice |
| | Sorghum | S. bicolor | Sorghum |
| | Triticum | | Wheat |
| | Hordeum | H. vulgare | Barley |
| | Zoysia | | Zoysia |
| Araliaceae | Eleutherococcus | | Siberian Ginseng |
| | Schefflera | S. arbolicola | Schefflera |
| | Panax | P. ginseng | Asian Ginseng |
| Cucurbitaceae | Cucumis | C. melo | Melon |
| | | C. sativus | Cucumber |
| | Cucurbita | | Pumpkin |
| Anacardiaceae | Toxicodendron | T. vernicifluum | Lacquer tree |
| | Mangifera | M. indica | Mango |
| Ebenaceae | Diospiros | D. kaki | Persimmon |
| Oxalidaceae | Averrhoa | A. carambola | Star Fruit |
| Asteraceae | Lactuca | L. sativa | Lettuce |
| | Chrysanthemum | C. morifolium | Florists' Daisy |
| | Glebionis | G. coronarium | Crown Daisy |
| | Carthamus | C. tinctorius | Safflower |
| | Helianthus | H. annuus | Sunflower |
| | Zinnia | | Zinnia Elegans |
| Apocynaceae | Catharanthus | C. roseus | Madagascar Periwinkle |
| Ranunculaceae | Nigella | | Fennelflower |
| | Aconitum | | Monkshood |
| | Coptis | C. japonica | Coptis |
| Lauraceae | Cinnamomum | C. camphora | Camphor Laurel |
| | | C. zeylanicum | Cinnamon |
| Moraceae | Ficus | F. carica | Fig Tree |
| | | F. elastica | Indian Rubber Tree |
| Papaveraceae | Papaver | P. somniferum | Opium Poppy |
| | | P. rhoeas | Corn Poppy |
| Strelitziaceae | Strelitzia | | Bird of Paradise |
| Piperaceae | Piper | P. nigrum | Pepper |
| Araceae | Amorphophallus | A. konjac | Amorphophallus Konjac |
| | Colocasia | C. esculenta | Eddoe |

TABLE 28-continued

Plant List

| Family | Genus | Species | Plant Name |
| --- | --- | --- | --- |
| Lamiaceae | Perilla | P. frutescens | Red Shiso |
|  | Ocimum | O. basilicum | Basil |
| Zingiberaceae | Zingiber | Z. officinals | Ginger |
|  | Curcuma | C. longa | Turmeric |
| Apiaceae | Bupleurum | B. stenophyllum | Bupleurum Scorzonerifolium |
|  | Apium | A. graveolens | Celery |
|  | Daucus | D. carota | Carrot |
|  | Coriandrum | C. sativum | Coriander |
| Meliaceae | Azadirachta | A. indica | Neem |
| Polygonaceae | Fagopyrum | F. esculentum | Buckwheat |
|  | Rheum |  | Rhubarb |
| Ericaceae | Vaccinium | Cyanococcus | Blueberry |
|  | Pieris | P. japonica | Japanese Andromeda |
| Passifloraceae | Passiflora | edulis | Passion Fruit |
| Euphorbiaceae | Ricinus | R. communis | Castor Bean |
|  | Manihot | M. esculenta | Cassava |
|  | Hevea | H. brasiliensis | Para Rubber Tree |
| Eucommiaceae | Eucommia | E. ulmoides | Eucommia Ulmoides Oliver |
| Solanaceae | Solanum | melongena | Eggplant |
|  |  | S. tuberosum | Potato |
|  |  | S. lycopersicum | Tomato |
|  | Nicotiana | N. tabacum | Tobacco |
|  | Datura | D. metel | Angel's Trumpet |
| Caryophyllaceae | Dianthus | D. caryophyllus | Carnation |
|  |  | D. supperbus | Dianthus |
| Alliaceae | Allium | A. cepa | Onion |
| Mimosoideae | Albizia | A. julibrissin | Silk Tree |
|  | Acacia |  | Gum Arabic |
| Musaceae | Musa |  | Banana |
| Rosaceas | Amygdalus | A. persica | Peach |
|  | Fragaria |  | Strawberry |
|  | Malus | M. pumila | Apple |
|  | Pyrus | P. communis | European Pear |
|  |  | P. pyilfolia | Pear |
|  | Prunus |  | Cherry |
|  |  | P. mume | Japanese Apricot |
|  |  | P. dulcis | Almond |
| Bromeliaceae | Ananas | A. comosus | Pineapple |
| Caricaceae | Carica | P. papaya | Papaya |
| Amaryllidaceae | Allium | A. cepa | Onion |
|  | Allium | A. sativum | Garlic |
| Convolvulaceae | Ipomoea | I. batatas | Sweet Potato |
| Myrtaceae | Eucalyptus |  | Eucalyptus |
| Vitaceae | Vitis |  | Grape |
| Fagaceae | Quercus | Q. acutissima | Sawtooth Oak |
|  |  | Q. suber | Cork Oak |
|  | Castanea | C. crenata | Japanese Chestnut |
| Paeoniaceae | Paeonia | P. lactiflora | Peony |
| Ephedraceae | Ephedra | E. sinica | Ephedra Sinica |
| Actinidiaceae | Actinidia | A. chinensis | Kiwi Fruit |
| Fabaceae | Pisum | P. sativum | Pea |
|  | Glycine | G. max | Soybean |
| Rutaceae | Poncirus | P. trifoliata | Hardy Orange |
|  | Citrus | C. unshiu | Citrus Unshiu |
|  |  | C. sinensis | Orange |
|  |  | C. limon | Lemon |
| Boraginaceae | Myosotis | M. scorpioides | Myosotis |
| Berberidaceae | Nandina | N. domestica | Heavenly Bamboo |
| Oleaceae | Olea | O. europaea | Olive |
|  | Jasminum |  | Jasmine |
| Arecaceae | Phoenix | P. dactylifera | Manila palm |
| Salicaceae | Salix |  | Willow |
|  | Populus | P. nigra | Lombardy Poplar |
| Dioscoreaceae | Dioscorea | D. japonica | Japanese Yam |
| Saxifragaceae | Hydrangea | H. serrata | Sweet Hydrangea Leaf |
| Liliaceae | Asparagus |  | Asparagus |
|  | Lilium |  | Lily |
|  | Liriope | L. muscari | Liriope |

Example 25

Synthetic pulp (manufactured by Mitsui Chemicals, Inc.; SWP (Registered Trademark): E400) was prepared into a cube with a size of 100 mm×100 mm×100 mm (in height), and the cube was then floated on the liquid surface of a nutrient solution (the composition is shown in Table 18) poured into a cultivation case. After a hole with a size of 20 mm×20 mm×10 mm (in depth) was made on the upper surface of the synthetic pulp, a broad bean seed was put in the hole (seeding on May 31, 2012). Twenty two days after the seeding, when the plant grew up to approximately 200 mm in height, *Aphis craccivora* was released to the plant. Seven days after the insect release, an aqueous solution dissolved with 10 mg of dinotefuran (manufactured by MITSUI CHEMICALS AGRO, INC.; an insecticide classified in neonicotinoids) in 1,000 mL of the nutrient solution was prepared, and the solution was then inserted to the synthetic pulp by a syringe. The number of *Aphis craccivora* surviving in four days after the insertion of the solution to the synthetic pulp was compared with the number of *Aphis craccivora* before the insertion of the solution in order to check the efficacy of dinotefuran against *Aphis craccivora*. The result is shown in Table 29.

TABLE 29

Number of Surviving *Aphis Craccivora*

|  |  | Days after Insect Release (days) | | |
| --- | --- | --- | --- | --- |
|  |  | 0 (before Insect Release) | 7 | 11 |
| Days after Dinotefuran Insertion (days) | | | 0 | 4 |
| Number of Surviving Insects | Egg | 0 | 7 | 0 |
|  | Larva | 0 | 129 | 0 |
|  | Total (egg + larva) | 0 | 136 | 0 |

Example 26

Synthetic pulp (manufactured by Mitsui Chemicals, Inc.; SWP (Registered Trademark): E400) was prepared into a cube with a size of 100 mm×100 mm×100 mm (in height), and the cube was then floated on the liquid surface of a nutrient solution (the composition is shown in Table 18) poured into a cultivation case. After a hole with a size of 20 mm×20 mm×10 mm (in depth) was made on the upper surface of the synthetic pulp, a broad bean seed was put in the hole (seeding on May 31, 2012). Twenty two days after the seeding, when the plant grew up to approximately 200 mm in height, *Aphis craccivora* was released to the plant. Seven days after the insect release, an aqueous solution dissolved with 1.5 mg of dinotefuran (manufactured by MITSUI CHEMICALS AGRO, INC.; an insecticide classified in neonicotinoids) in 500 mL of the nutrient solution was prepared, and the solution was mixed with the nutrient solution in the cultivation case. The number of *Aphis craccivora* surviving in four days after mixing the solution was compared with the number of *Aphis craccivora* before mixing the solution in order to check the efficacy of dinotefuran against *Aphis craccivora*. The result is shown in Table 30.

TABLE 30

Number of Surviving *Aphis Craccivora*

|  |  | Days after Insect Release (days) | | |
| --- | --- | --- | --- | --- |
|  |  | 0 (before Insect Release) | 7 | 11 |
| Days after mixing Dinotefuran Solution (days) | | | 0 | 4 |
| Number of Surviving Insects | Egg | 0 | 108 | 0 |
|  | Larva | 0 | 120 | 0 |
|  | Total (egg + larva) | 0 | 228 | 0 |

Reference Example 1

A ceramic (a hollow cylindrical ceramic with a size of inner diameter: 20 mmϕ×outer diameter: 28 mmϕ×height: 80 mm) manufactured by Phytoculture Control Co., Ltd. was immersed in a nutrient solution (the composition is shown in Table 2) poured into a cultivation case, and a wheat seed was put on the inner surface of the ceramic in order to observe the wheat growth (seeding on Jan. 6, 2012) and to measure the amount of the nutrient solution consumed during the growth. The results of the growth and the amount of the nutrient solution consumption are shown in Table 31 in contrast to the results of Example 2.

TABLE 31

Comparison of Results of Wheat Growth and Amount of Nutrient Solution Consumption

|  |  | Days after Seeding (days) | | | | |
| --- | --- | --- | --- | --- | --- | --- |
|  |  | 3 | 21 | 37 | 56 | 72 |
| Ceramic | Height of Plants (mm) | Germination | 215 | 350 | 434 | 437 |
|  | Number of Leaves (pieces) |  | 3 | 5 | 9 | 10 |
|  | Integrated Amount of Nutrient Solution Consumption (mL) |  |  | 641 | 1,342 | 2,166 |
| SWP (Registered Trademark) | Height of Plants (mm) | 5 | 280 | 405 | 450 | 558 |
|  | Number of Leaves (pieces) | 0 | 5 | 12 | 19 | 22 |
|  | Integrated Amount of Nutrient Solution Consumption (mL) |  | 28 | 183 | 333 | 555 |

Reference Example 2

SkyGel (0.64 g) manufactured by Mebiol Inc. absorbing and retaining a nutrient solution (the composition is shown in Table 2) which is 100 times weight of SkyGel was prepared into a cube being 40 mm on a side, wheat seeds were put on the upper surface of the SkyGel (seeding on Nov. 29, 2011), and the nutrient solution was inserted into the SkyGel every time when the volume of the SkyGel was approximately half by drying in order to observe the growth. The result of the growth is shown in Table 32 in contrast to the result of Example 2.

TABLE 32

Comparison of Result of Wheat Growth

| | | | Days after Seeding (days) | | | | |
|---|---|---|---|---|---|---|---|
| | | | 2 | 13 | 30 | 56 | 83 |
| SkyGel | Height of Plants (mm) | Germination | | 150 | 210 | 320 | 370 |
| | Number of Leaves (pieces) | | 2 | 4 | 8 | 9 | |
| SWP (Registered Trademark) | Height of Plants (mm) | Germination | | 165 | 335 | 450 | 635 |
| | Number of Leaves (pieces) | | 3 | 10 | 19 | 22 | |

Reference Example 3

Commercially available polyvinyl alcohol (PVA) was prepared into a cuboid with a size of 70 mm×70 mm×35 mm (in height), the PVA was then immersed in a nutrient solution (the composition is shown in Table 2) poured into a cultivation case, and wheat seeds were put on the upper surface of the PVA in order to observe the growth (seeding on Nov. 29, 2011). The result of the growth is shown in Table 33 in contrast to the results of Example 2.

TABLE 33

Comparison of Result of Wheat Growth

| | | | Days after Seeding (days) | | | | |
|---|---|---|---|---|---|---|---|
| | | | 2 | 9 | 21 | 30 | 41 |
| PVA | Height of Plants (mm) | Germination | | 60 | 117 | 199 | Death |
| | Number of Leaves (pieces) | | 2 | 3 | 4 | | |
| SWP (Registered Trademark) | Height of Plants (mm) | Germination | | 120 | 280 | 335 | 419 |
| | Number of Leaves (pieces) | | 2 | 5 | 10 | 12 | |

Reference Example 4

Mumak (a good based on polyurethanes) manufactured by Achilles Corporation was prepared into a cuboid with a size of 100 mm×100 mm×25 mm (in height), the cuboid was then immersed in a nutrient solution (the composition is shown in Table 2) poured into a cultivation case, and wheat seeds were put on the upper surface of the Mumak in order to observe the growth (seeding on Nov. 29, 2011). The result of the growth is shown in Table 34 in contrast to the result of Example 2.

TABLE 34

Comparison of Result of Wheat Growth

| | | | Days after Seeding (days) | | | | |
|---|---|---|---|---|---|---|---|
| | | | 2 | 9 | 21 | 27 | 37 |
| Mumak | Height of Plants (mm) | Germination | | 140 | 230 | 230 | Death |
| | Number of Leaves (pieces) | | 2 | 3 | 4 | | |
| SWP (Registered Trademark) | Height of Plants (mm) | Germination | | 120 | 280 | 330 | 405 |
| | Number of Leaves (pieces) | | 2 | 5 | 9 | 12 | |

Reference Example 5

A commercially available non-woven fabric was prepared into a cuboid with a size of 80 mm×10 mm×0.1 mm (in height), the non-woven fabric was then floated on a nutrient solution (the composition is shown in Table 2) poured into a cultivation case, and wheat seeds were put on the upper surface of the non-woven fabric in order to observe the growth and to measure the amount of the nutrient solution consumed during the growth (seeding on Dec. 20, 2011). The results of the growth and the amount of the nutrient solution consumption are shown in Table 35 in contrast to the results of Example 2.

TABLE 35

Comparison of Results of Wheat Growth and Amount of Nutrient Solution Consumption

| | | | Days after Seeding (days) | | | | |
|---|---|---|---|---|---|---|---|
| | | | 2 | 21 | 37 | 58 | 69 |
| Non-woven fabric | Number of Leaves (pieces) | Germination | | 4 | 5 | 10 | 12 |
| | Integrated Amount of Nutrient Solution Consumption (mL) | | | 214 | 407 | 914 | 1,271 |
| SWP (Registered Trademark) | Number of Leaves (pieces) | Germination | | 5 | 12 | 19 | 22 |
| | Integrated Amount of Nutrient Solution Consumption (mL) | | | 28 | | | 527 |

Reference Example 6

Grotop Master (a good based on rockwools) manufactured by CRODAN was prepared into a cuboid with a size of 80 mm×100 mm×75 mm (in height), the Grotop Master was then immersed in a nutrient solution (the composition is shown in Table 2) poured into a cultivation case, and wheat seeds were put on the upper surface of the Grotop Master in order to observe the growth and to measure the amount of the nutrient solution consumed during the growth (seeding on Dec. 20, 2011). The results of the growth and the amount of the nutrient solution consumption are shown in Table 36 in contrast to the results of Example 2.

TABLE 36

Comparison of Results of Wheat Growth and Amount of Nutrient Solution consumption

| | | Days after Seeding (days) | | | | |
|---|---|---|---|---|---|---|
| | | 2 | 21 | 37 | 56 | 69 |
| Grotop Master | Number of Leaves (pieces) | Germination | 4 | 6 | 8 | 9 |
| | Integrated Amount of Nutrient Solution Consumption (mL) | | 213 | 475 | 938 | 1,519 |
| SWP (Registered Trademark) | Number of Leaves (pieces) | Germination | 5 | 12 | 19 | 22 |
| | Integrated Amount of Nutrient Solution Consumption (mL) | | 28 | | 333 | 527 |

Reference Example 7

A ceramic manufactured by Phytoculture Control Co., Ltd. was immersed in a nutrient solution (the composition is shown in Table 4) poured into a cultivation case, and grape tomato seeds were put on the surface of the ceramic in order to measure the sugar content of the fruitive grape tomato pulp by a hand-held refractometer IATC-1E (Brix: 0% to 32%) manufactured by Iuchi Seieido Co., Ltd. The result or the sugar content is shown in Table 37 in contrast to the results of Example 3.

TABLE 37

Comparison of Result of Sugar Content of Grape Tomato

| | | Days after Seeding (days) |
|---|---|---|
| | | 167 |
| Sugar Content (Brix, %) | Ceramic | 10.0 |
| | SWP (Registered Trademark) | 14.0 |

Reference Example 8

Synthetic pulp (manufactured by Mitsui Chemicals, Inc.; SWP (Registered Trademark): E400) was prepared into a cube with a size of 100 mm×100 mm×100 mm (in height), and the cube was then floated on the liquid surface of a nutrient solution (the composition is shown in Table 18) poured into a cultivation case. After a hole with a size of 20 mm×20 mm×10 mm (in depth) was made on the upper surface of the synthetic pulp, a broad bean seed was then put in the hole (seeding on May 31, 2012). Twenty two days after the seeding, when the plant grew up to approximately 200 mm in height, *Aphis craccivora* was released to the plant in order to observe the transition of the number of surviving *Aphis craccivora*. The result was shown in Table 38 in contrast to the results of Examples 25 and 26.

TABLE 38

Number of Surviving *Aphis Craccivora*

| | | | Days after Insect Release (days) | | |
|---|---|---|---|---|---|
| | | | 0 (before Insect Release) | 7 | 11 |
| Number of Surviving Aphis Craccivora | No Dinotefuran Treatment | Egg | 0 | 6 | 154 |
| | | Larva | 0 | 54 | 162 |
| | | Total (egg + larva) | 0 | 60 | 316 |
| | Example 25 | Egg | 0 | 7 | 0 |
| | | Larva | 0 | 129 | 0 |
| | | Total (egg + larva) | 0 | 136 | 0 |
| | Example 26 | Egg | 0 | 108 | 0 |
| | | Larva | 0 | 120 | 0 |
| | | Total (egg + larva) | 0 | 228 | 0 |
| | (Reference) | | | 0 | 4 |
| Days after Dinotefuran Treatment (days) | | | | | |

REFERENCE SIGNS LIST

1. Materials
2. Liquid such as water, nutrient solution and agrochemical products
3. Plant (example)

The invention claimed is:

1. A plant cultivation material, which comprises a material capable of allowing plant roots to grow so that the roots can respire sufficient air, from which the plant can absorb the amount of the elements necessary for the plant growth as much as the plant wants whenever the plant wants, and which provides a cultivation environment to accelerate the plant growth and which comprises a layered structure capable to control the root growth so that roots can respire sufficient air, from which plants can absorb the amount of the elements necessary for the plant growth as much as plants want whenever plants want, and which provides the cultivation environment to accelerate the plant growth, wherein the layered structure comprises a planar structure formed by intertwining materials constituting the cultivation material for growth of the roots not only in the layer thickness direction, but also in a direction perpendicular to the layer thickness direction along to the planar structure.

2. A plant cultivation material according to claim 1, wherein the layered structure comprises a three-dimensional structure formed by laminating a planar structure on the other planar structure in a layer thickness direction, wherein, the planar structures are formed by continuously or discontinuously intertwining the materials constituting the cultivation material in a two-dimensional manner.

3. A plant cultivation material according to claim 2, wherein the thickness of the planar structure is 0.01 mm or more.

4. A plant cultivation material, which has liquid retentivity and liquid transitivity, which comprises a material capable of allowing plant roots to crow so that the roots can respire sufficient air, from which the plant can absorb an amount of the elements necessary for plant growth as much as the plant wants whenever the plant wants, and which provides a cultivation environment to accelerate plant growth and which comprises a layered structure capable to control the root growth so that roots can respire sufficient air, from which plants can absorb the amount of the elements necessary for the plant growth as much as plants want whenever plants want, and which provides a cultivation environment to accelerate the plant growth, wherein the layered structure comprises a planar structure formed by intertwining materials constituting the cultivation material for growth of the roots not only in the layer thickness direction, but also in a direction perpendicular to the layer thickness direction along to the planar structure.

5. A plant cultivation material according to claim 4, wherein the layered structure comprises a three-dimensional structure formed by laminating a planar structure on the other planar structure in a layer thickness direction, wherein, the planar structures are formed by continuously or discontinuously intertwining the materials constituting the cultivation material in a two-dimensional manner.

6. A plant cultivation material according to claim 5, wherein the thickness of the planar structure is 0.01 mm or more.

7. A plant cultivation material, which is capable of retaining liquid such as water, a nutrient solution and agrochemical products, which has cavities for smooth transitivity of the liquid, which comprises a layered structure capable of allowing plant roots to grow so that the roots can respire sufficient air, from which the plant can absorb the amount of the elements necessary for plant growth as much as the plant wants whenever the plant wants, and which provides a cultivation environment to accelerate plant growth and which comprises a layered structure capable to control the root growth so that roots can respire sufficient air, from which plants can absorb the amount of the elements necessary for the plant growth as much as plants want whenever plants want, and which provides the cultivation environment to accelerate the plant growth, wherein the layered structure comprises a planar structure formed by intertwining materials constituting the cultivation material for growth of the roots not only in the layer thickness direction, but also in a direction perpendicular to the layer thickness direction along to the planar structure.

8. A plant cultivation material according to claim 7, wherein the layered structure comprises a three-dimensional structure formed by laminating a planar structure on the other planar structure in a layer thickness direction, wherein, the planar structures are formed by continuously or discontinuously intertwining the materials constituting the cultivation material in a two-dimensional manner.

9. A plant cultivation material according to claim 8, wherein the thickness of the planar structure is 0.01 mm or more.

10. A plant cultivation method using the plant cultivation material according to claim 1.

11. A plant cultivation method using the plant cultivation material according to claim 2.

12. A plant cultivation method using the plant cultivation material according to claim 3.

13. A plant cultivation method using the plant cultivation material according to claim 4.

14. A plant cultivation method using the plant cultivation material according to claim 5.

15. A plant cultivation method using the plant cultivation material according to claim 6.

16. A plant cultivation method using the plant cultivation material according to claim 7.

17. A plant cultivation method using the plant cultivation material according to claim 8.

18. A plant cultivation method using the plant cultivation material according to claim 9.

* * * * *